Oct. 25, 1960     W. HANSTEIN ET AL     2,957,962
CLUTCH ACTUATED SWITCH
Filed Aug. 12, 1957

INVENTORS.
WALTER HANSTEIN
RICHARD A. JONES
BY
ATTORNEY

United States Patent Office 2,957,962
Patented Oct. 25, 1960

2,957,962
CLUTCH ACTUATED SWITCH

Walter Hanstein, Villa Nova, and Richard H. Jones, Bridgeport, Pa., assignors to Burroughs Corporation, Detroit, Mich., a corporation of Michigan Filed Aug. 12, 1957, Ser. No. 677,541

5 Claims. (Cl. 200—92)

The present invention relates to clutches and more particularly to a high speed clutch providing means for controlling the operation of associated electrical equipment.

The object of the invention is to provide a novel clutch and switch assembly capable of many uses as a component of an electro-mechanical system but here more specifically for use as a part of an accounting machine assembly.

A further object is to provide a reliable and accurately operating clutch and switch combination which is dependable for stopping and starting in precise timed relation with associated mechanisms.

A still further object is to provide a clutch assembly wherein one or more switches controlling electrical circuits are closed in response to clutch operation in combination with clutch actuated means for preventing premature opening of a switch during a clutch operating cycle.

Various other objects, advantages and meritorious features of the invention will become more fully apparent from the following specification and accompanying drawings, wherein.

Figure 1:
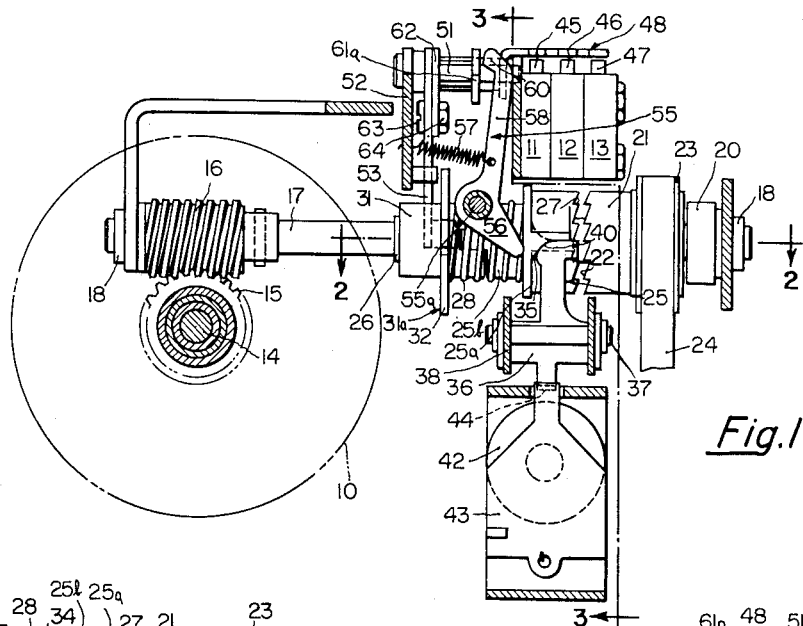
Fig. 1 is a side elevational view of one form of clutch assembly embodying the present invention.

The presently illustrated embodiment of the invention, while capable of operation as a full revolution switch operating clutch, is primarily concerned with providing such a mechanism operable either in single or in multiple increments of half revolutions.

Referring now to the drawings, one form of mechanism in accordance with the present invention is shown illustratively as a means for intermittently driving an element, shown in broken lines at 10, for controlled rotation. Related circuit means, not shown, is to be controlled by one or more switches illustrated here by three switches 11, 12 and 13 which are controlled simultaneously with the clutch operation. While of broader applicability, the invention is particularly suited for use in apparatus of the type shown and described in the co-pending application of Bradshaw et al., Serial No. 724,985, filed March 31, 1958 and assigned to the assignee of the present invention.

Element 10 is keyed to a shaft 14 having an attached gear 15 in mesh with a worm 16 keyed to a driven shaft 17 mounted in end bearings 18 and held against endwise movement by a collar 20 pinned on the right hand end thereof, and the worm 16 abutting the end bearing 18. Mounted adjacent to the collar 20 and freely rotatable on shaft 17 is the clutch drive part comprising a cylindrical body or sleeve 21 having an end face in the form of clutch teeth 22. The body 21 is arranged to be continuously driven by a pulley 23 fixed thereto and driven by a belt 24 from a source of power, not shown.

Figure 4:
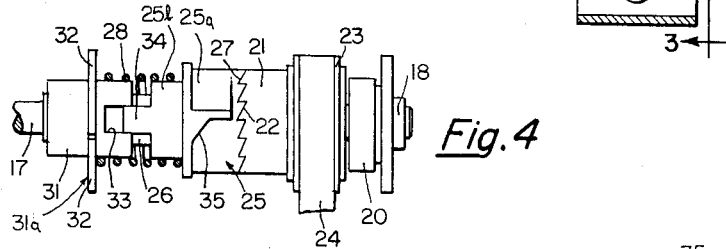
Fig. 4 is a detail view of side elevation of the driving connection for the driven shaft.
Figure 2:
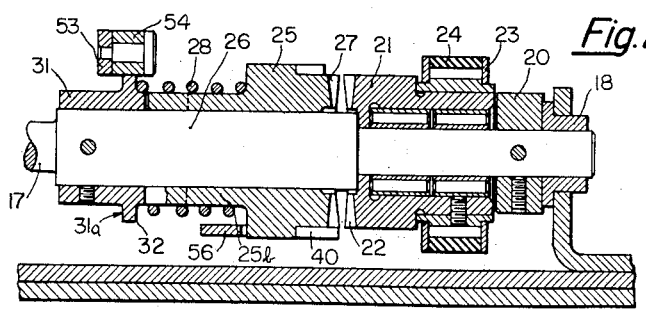
Fig. 2 is a section view taken on line 2—2 of Fig. 1.
Figure 3:
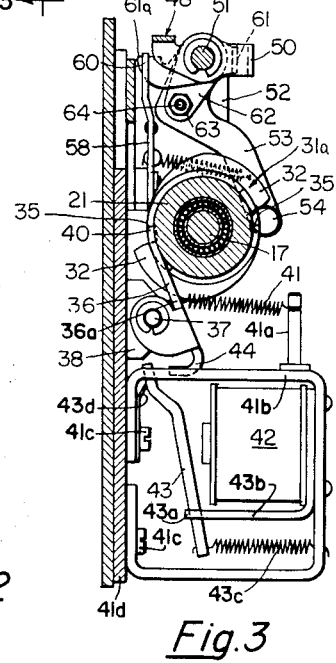
Fig. 3 is a section view taken on line 3—3 of Fig. 1.

For transmitting motion of body 21 to the driven shaft 17, the driven clutch part comprises the enlarged portion 25a of a tubular cylindrical member 25 which is linearly slidable on an enlarged diameter portion 26 of shaft 17. The end face of member 25, which is juxtaposed to the clutch body teeth 22, is provided with teeth 27 to mesh with the teeth 22 and thereby transmit motion from the drive part of the clutch to the driven part. Member 25 also has a length portion 25b of reduced diameter extending into a coil spring 28 (Figs. 2 and 4), which is held under compression between the enlarged end of the member 25 and a camming flange 31a formed as integral part of a bushing 31. This flange is formed with two diametrically disposed cam lobes 32 (Fig. 3) for a purpose which will presently be described. Bushing 31 is pinned or otherwise made fast to the shaft portion 26 to transmit rotation of the clutch driven member 25 to the driven shaft 17, through the medium of transverse square slots 33 diametrically disposed in the end of bushing 31, such slots 33 telescoping with two similarly diametrically disposed square lugs 34 projecting from the juxtaposed end 25b of clutch member 25. The overall length of the driven clutch member 25 is such as to permit the necessary clutching and declutching of the clutch members 21 and 25 when the member 25 is shifted endwise, compressing spring 28, and without disengaging lugs 34 from slots 33.

In order to perform this declutching operation the periphery of member 25 is formed with two quadrant-like cams 35 (Figs. 3 and 4) disposed one hundred and eighty degrees apart to ride successively into the path of a clutch shifting dog 36 (Fig. 1), which is pivotally mounted by pin 37 to a fixed bracket 38 to swing toward and away from the periphery of member 25. The upper free end of dog 36 has an arcuate cam 40 so that when in the path of either of cams 35, the member 25 will be forced linearly to the left along shaft portion 26 against spring 28, so to remove teeth 27 from engagement with teeth 22 thus to stop rotation of shaft 17. The dog 36 is normally biased to declutching position by a stretched tension spring 41 (Fig. 3), having one end attached to a stud 41a extending upwardly from a bracket 41b secured as by screws 41c to fixed structure 41d. The other end of the spring is secured to dog 36 at 36a above its pivot 37. The dog is shifted by the energizing of a solenoid 42 out of the path of cams 35 when the clutch is to operate as a driving means. The solenoid 42 is included in any selected electrical circuit for timed operation as will be understood. Solenoid 42 is secured to bracket 41b and has its clapper 43 pivoted at 43a on an angle member 43b also secured to bracket 41b. Clapper 43 is normally biased in a counterclockwise direction by spring 43c, one end of which is attached to bracket 41b and its other end to the lower end of the clapper 43 below its pivot point 43a. Counterclockwise movement of the clapper is terminated by contact thereof with a spring finger 43d.

The shifting action is accomplished by the engagement of clapper 43 of solenoid 42 with a turned or hooked lower end 44 of dog 36. Thus when solenoid 42 is energized its clapper 43 is drawn into engagement with dog end 44 thus to rock the dog out of the path of cams 35, whereupon the compression spring 28 shifts the clutch member 25 linearly to the right, as shown here, to mesh the two sets of clutch teeth 22 and 27 and cause the member 25 to be rotated. Rotation of member 25 is transmitted to bushing 31 and from it to the driven shaft 17. This drive of the shaft 17 can be timed to comprise only a half revolution of the shaft, or multiple increments of half revolutions according to the timing circuit control for solenoid 42. When solenoid 42 is de-energized spring 41 snaps the dog 36 against member 25 so that its camming end 40 is met by one of cams 35, which thereupon rapidly shifts the clutch member 25 to declutching position.

Figure 5:
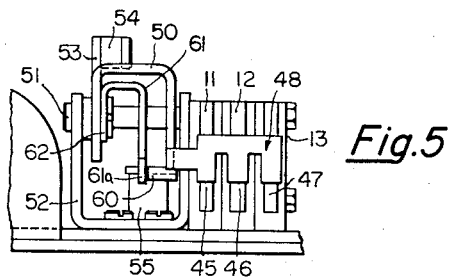
Fig. 5 is a detail in plan of the clutch-controlled switch operating means.

In particular accordance with the present invention the clutch mechanism includes a control for actuating and holding one or more circuit switches in closed or open position according to requirements and here, for example, the three switch units 11, 12 and 13. The switches are suitably mounted adjacent the clutch mechanism with switch levers 45, 46 and 47 protruding into the path of movement of a depressing member 48 extending across and in close proximity to said switch levers. Member 48 preferably is formed as a lateral extension of one leg of a U-shaped rock lever 50, see Fig. 5. The two legs of lever 50 are pivoted upon a pin 51 mounted in a bracket 52 which also supports the switch assembly.

Lever 50 (Fig. 3) is rocked by an extended arm 53, the free end of which carries a roller 54 disposed in the path of cam lobes 32 on flange 31a of bushing 31. When the bushing is rotated by the clutch, lever 50 is rocked to actuate the depressor member 48 to close the switches thus to control circuits associated therewith. Provision is made to latch depressing member 48 in operative position during cycling of the clutch, such means being in the form of a bell crank lever 55 pivoted on a fixed pin 55a and so located that its leg 56 is biased by a tension spring 57 to ride against the face of the driven clutch part 25. Its other leg 58 terminates in a hook 60 to latch over a detent 61a under the action of spring 57 when part 25 moves to clutching position, such detent 61a being an offset leg of a U-shaped member 61 which is pivoted for swinging movement on pin 51. The other leg 62 of the U-shaped member is fastened to rock lever 50 by an eccentric stud 63 and nut 64 to provide an adjustment for proper setting of the latch member with respect to the detent member.

In explaining the control and operation of the clutch, reference is made to Fig. 1 of the drawings wherein the declutching cam dog 36 has been engaged by a cam 35 of the driven clutch member 25 and as a result member 25 has been shifted to the left separating the driving and driven teeth 22 and 27 while compressing the restoring spring 26. This lengthwise shifting of member 25 also picks up leg 56 of the switch latching bell crank lever 55 to rock the latter and so release the latch hook 60 from detent holding position permitting the switches to open or close as the case may be. In this declutched position of the parts, roller 54 of the switch controlling rock lever 50 has travelled off of a cam lobe 32 thereby lifting the depressing member 48 away from the switch controlling levers.

When the clutch is to operate in a cycle of operation, solenoid 42 is energized by a timed or other pulse to swing its clapper in the direction to engage the dog end 44 and thereby retract the dog 36 away from a cam 35 whereupon the restraint upon compression coil spring 28 is removed and the driven clutch member 25 is shifted to engage drive body 21. Shaft 17 is now operated to turn part 10 through one or more integral numbers of half revolutions of the clutch in accordance with the timing of the circuit for solenoid 42. When this solenoid is deenergized, as herebefore explained, the cam dog 40 is released to the action of its restoring spring 41 and brings its cam end into the path of a cam on the driven member 25 to cause an unclutching of the parts.

It will now be apparent that the present invention provides a complete unitary clutch assembly which has been devised as a novel arrangement of related parts to produce a high speed positive clutching and declutching operation in timed sequence of single or multiple half revolution cycles, during which switch elements are controlled for interlocking of certain electrical circuits.

What is claimed is:

1. A clutch assembly comprising, a driving clutch member, a driven clutch member, a shaft rotatable by said driven clutch member, means for shifting said driven clutch member into clutching relation with the driving member, means for shifting said driven clutch member out of said clutching relation with the driving member, a switch positioned adjacent said clutch members, means operated by the rotation of said driven clutch member to actuate said switch, means operated by said driven clutch member during shifting thereof into clutching engagement with said driving clutch member to lock said switch actuating means, and during shifting thereof out of clutching relation with said driving clutch member to unlock said actuating means.

2. A clutch assembly comprising, a driving clutch member, a driven clutch member, a shaft rotatable by said driven clutch member, means for shifting said driven clutch member into clutching relation with the driving member, means for shifting said driven clutch member out of said clutching relation with the driving member, a switch positioned adjacent said clutch members, cam means on said driven clutch member, a lever operated by said cam means during rotation of said driven clutch member to actuate said switch, means operated by said driven clutch member during shifting thereof into clutching engagement with said driving clutch member to lock said switch actuating means, and during shifting thereof out of clutching relation with said driving clutch member to unlock said actuating means.

3. A clutch assembly comprising, a driving clutch member, a driven clutch member, a shaft rotatable by said driven clutch member, means for shifting said driven clutch member into clutching relation with the driving member, means for shifting said driven clutch member out of said clutching relation with the driving member, a switch positioned adjacent said clutch members, cam means on said driven clutch member, a lever operated by said cam means during the rotation of said driven clutch member to actuate said switch, a bell-crank operated by said driven clutch member during shifting thereof into clutching engagement with said driving clutch member to lock said switch actuating means, and spring means operable during shifting of said driving clutch member out of clutching relation with said driving clutch member to unlock said actuating means.

4. In a clutch assembly, the combination of, a driving clutch member, a driven clutch member, a shaft operable by said driven clutch member, means for shifting one of said members into clutching relation with the other of said members, means operable to release said clutching relation, a switch, means for mounting said switch adjacent said clutch parts, means operable by one of said members for actuating said switch, and latch means operable during shifting of said one of said members to clutching position to hold said actuating means in switch actuated position, and operable by said one of said members during its declutching movement to release said actuating means.

5. A clutch assembly according to claim 4 wherein said latch means comprises a pivoted bell crank, and a spring for biasing said crank to latching position, and wherein said one of said members engages said bell crank during unclutching movement thereof, thus to restore said bell crank to its unlatched position.

References Cited in the file of this patent

UNITED STATES PATENTS

| | | |
|---|---|---|
| 1,126,221 | Jacobs | Jan. 26, 1915 |
| 1,409,879 | Manley | Mar. 14, 1922 |
| 1,472,411 | Fine | Oct. 30, 1923 |
| 1,476,766 | Reynolds | Dec. 11, 1923 |
| 1,575,010 | Scheer | Mar. 2, 1926 |
| 2,265,133 | Gollwitzer | Dec. 9, 1941 |
| 2,689,674 | Goldberg | Sept. 21, 1954 |
| 2,804,778 | Booth | Sept. 3, 1957 |

FOREIGN PATENTS

| | | |
|---|---|---|
| 938,794 | Germany | Mar. 8, 1956 |